(12) United States Patent
Mitra (10) Patent No.: US 7,437,501 B2
(45) Date of Patent: Oct. 14, 2008

(54) COMBINING THE ADDRESS-MAPPING AND PAGE-REFERENCING STEPS IN A MEMORY CONTROLLER

(75) Inventor: Sambaran Mitra, West Bengal (IN)

(73) Assignee: Intel Corporation, Santa Clara, CA (US)

( * ) Notice: Subject to any disclaimer, the term of this patent is extended or adjusted under 35 U.S.C. 154(b) by 290 days.

(21) Appl. No.: 11/471,111

(22) Filed: Jun. 19, 2006

(65) Prior Publication Data

US 2007/0294503 A1 Dec. 20, 2007

(51) Int. Cl.
*G06F 12/06* (2006.01)
(52) U.S. Cl. .................. 711/108; 711/105; 365/230.03; 365/238.5
(58) Field of Classification Search ........................ None
See application file for complete search history.

(56) References Cited

U.S. PATENT DOCUMENTS

| | | | |
|---|---|---|---|
| 6,535,966 B1* | 3/2003 | Cherabuddi et al. | 711/154 |
| 2002/0065981 A1* | 5/2002 | Jenne et al. | 711/105 |
| 2005/0204094 A1* | 9/2005 | Rotithor et al. | 711/105 |

* cited by examiner

*Primary Examiner*—Jack A Lane
(74) *Attorney, Agent, or Firm*—Blakely, Sokoloff, Taylor & Zafman LLP (57) ABSTRACT

A method and apparatus for parallelizing address-mapping and page referencing in a memory controller. The page referencing may apply an input address to two separate content addressable memory components along with masks from a configuration register identifying rank-bank bits, page status bits and non-column bits. The content addressable memories each determine if matching content is present generating a 'hit' or 'miss.' The hit and miss indicators are applied to combinational logic to determine whether to generate a CAS, RAS-CAS or PRE-RAS-CAS indicator.

22 Claims, 5 Drawing Sheets

COMBINING THE ADDRESS-MAPPING AND PAGE-REFERENCING STEPS IN A MEMORY CONTROLLER

BACKGROUND

1. Field of the Invention

The invention relates to a method for performing memory accesses. Specifically, embodiments of the invention include a method and apparatus for the parallel execution of address-mapping and page-referencing in a memory controller.

2. Background

A processor in a computer system routinely accesses system memory to retrieve instructions and data, as well as, store instructions and data during the execution of applications, the operating system and all other programs. The processor sends these memory access requests, which may include both read requests and write requests, to a memory controller.

The memory controller makes a determination of the location of requested data for a read operation or the destination for a write operation in the system memory. The memory controller also determines the state of the relevant location in the memory. The memory controller performs address-mapping of an address supplied by the processor or other component requesting the memory access. The address mapping analyzes the input address to determine the rank, bank, row and column of the relevant location in memory. System memory addresses are grouped into ranks, which are subdivided into banks. The banks are organized as a set of rows and columns. The output of the address-mapping process is then used to perform page-referencing. Page-referencing involves a lookup of the state of the relevant location of memory using the rank-bank (a particular rank and bank combination) and row information from the address-mapping process. The page-referencing process determines if a relevant rank-bank is open and if the row is the last accessed row. This information is in turn used to determine if a column access strobe (CAS) command, a row access strobe (RAS) and CAS (RAS-CAS) command sequence or a precharge command (PRE)-RAS-CAS operation needs to be performed to access the relevant portion of memory.

Figure 1:
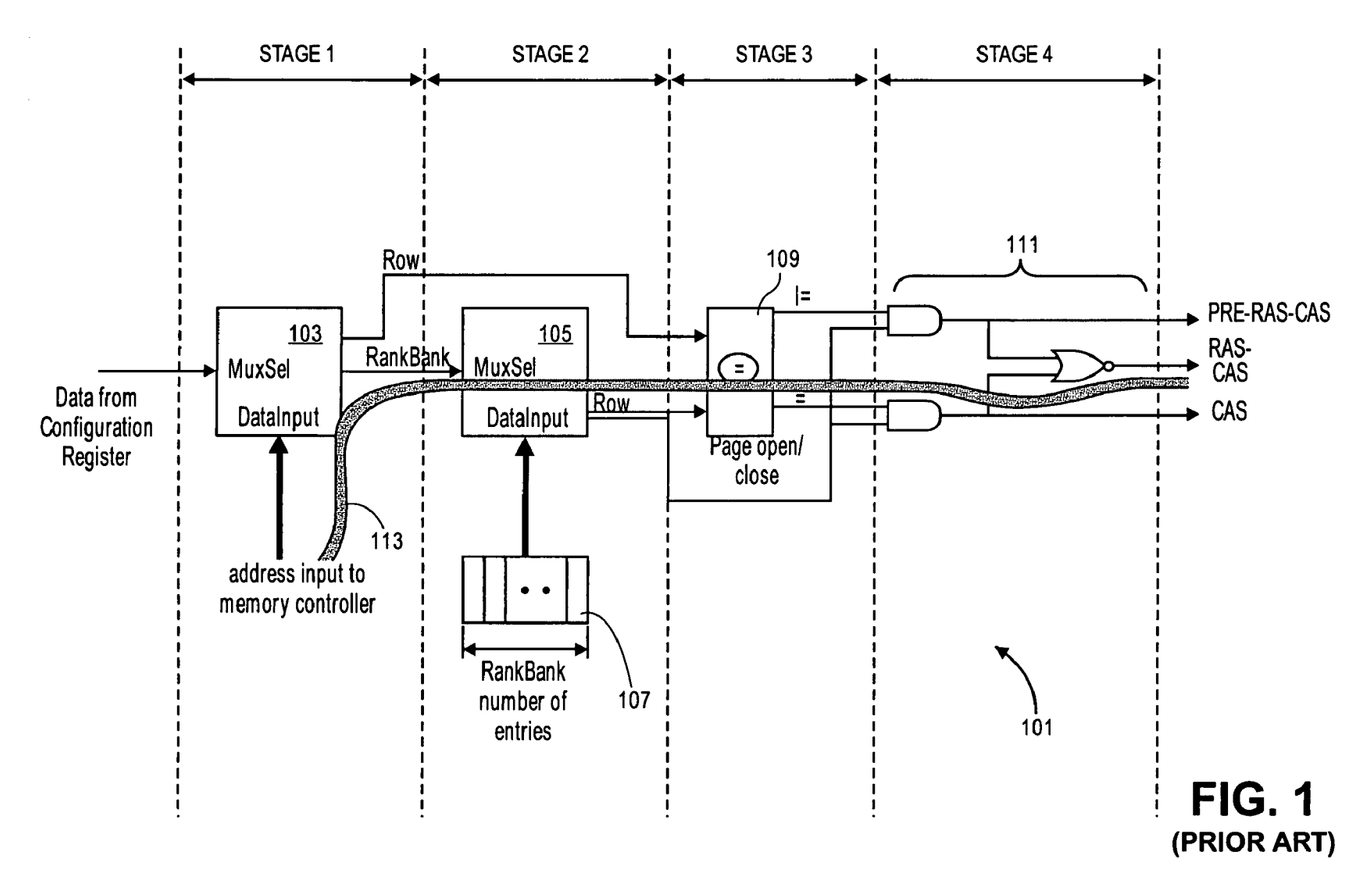
FIG. 1 is a diagram of a conventional address-mapping and page-referencing circuit.

FIG. 1 is a diagram of one embodiment of a conventional address-mapping and page-referencing component 101. The component receives an input address in a first stage and processes it in a multiplexor 103 that separates the rank-bank indicator, the row indicator and column indicator based on selector signals received from a configuration register. In a second stage, the page-referencing process begins with the use of a page table 107 containing the status of the rank-bank including an indicator of whether each rank-bank is dosed or open (e.g., page status bit) and the last accessed row using the rank-bank indicator identified in stage one. The page table 107 input is provided to the multiplexor 105 and the rank-bank indicator is supplied as the selector resulting in an output of the last accessed row and the open/closed status of the rank-bank.

In a third stage, the row indicator derived from the address input in stage one is compared with the last row accessed for the rank-bank, as determined in stage two, by a comparator 109. The output of the comparator 109 (match/no match) is supplied to combinational logic 111 in stage four. The combinational logic 111 generates one of a CAS command, RAS-CAS command sequence and a PRE-RAS-CAS command sequence or indicator based on the comparator input and the open/close rank-bank indicator from stage three. One of these indicators is applied to the memory device along with the rank, bank, row and column indicators and any relevant data (for a write operation) to carry out the memory access request.

Guideline line 113 shows the latency path through the four stages of this component. The length of this path indicates the relative length of time required to complete these four stages and perform this segment of the memory access request. The length of this latency directly contributes to the length of time to carry out the entire memory access request and consequently the speed of memory access in the computer system.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

In the following description, for the purpose of explanation, numerous specific details are set forth in order to provide a thorough understanding of the various embodiments. It will be apparent to one of ordinary skill in the art that the embodiments may be practiced without some of these specific details. In other instances, certain structures and devices are omitted or simplified to avoid obscuring the details of the various embodiments.

The following description and the accompanying drawings provide examples for the purposes of illustration. However, these examples should not be construed in a limiting sense as they are not intended to provide an exhaustive list of all possible implementations.

Figure 2:
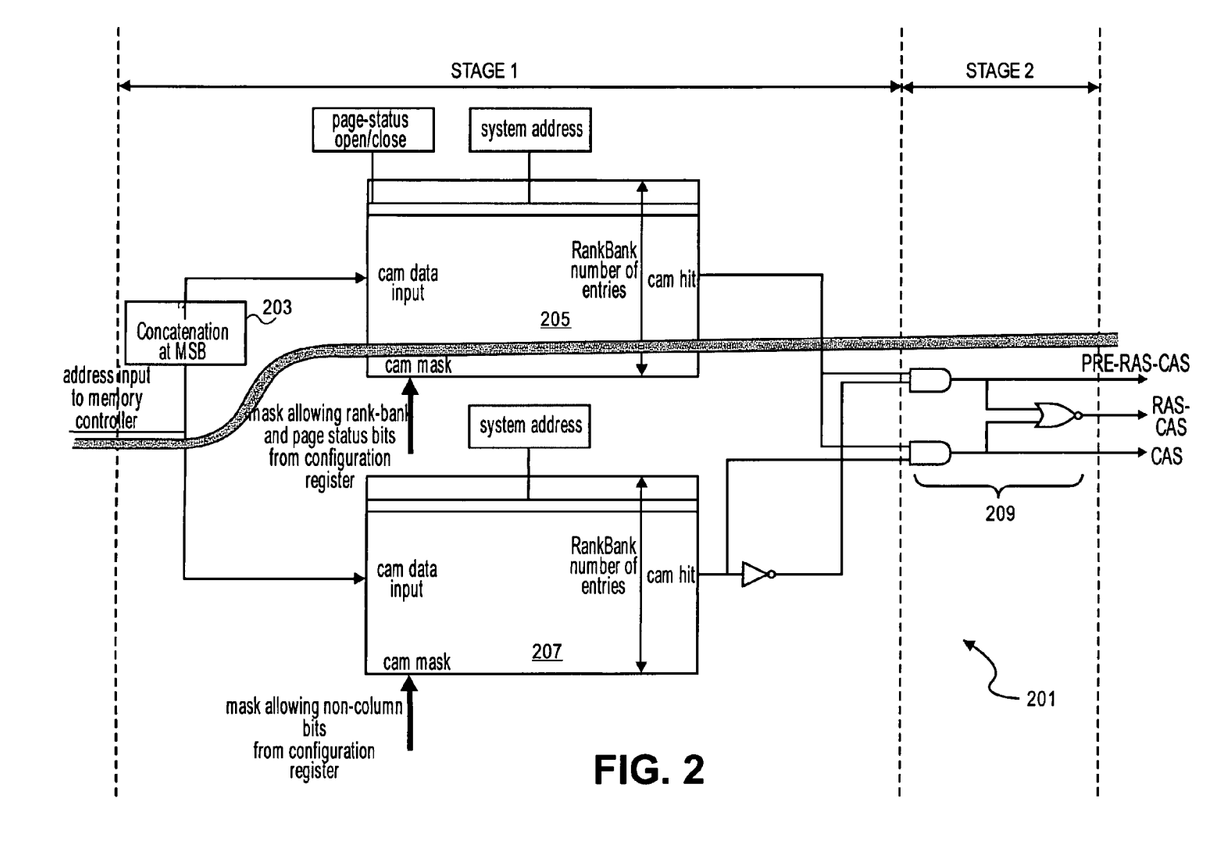
FIG. 2 is a diagram of one embodiment of a page-referencing circuit.

FIG. 2 is a diagram of one embodiment of a page referencing circuit. This circuit may complete the page-referencing operation in a single stage. This page-referencing operation may be completed independent of an address mapping operation. This allows for the two operations to be completed in parallel and thereby decreases the time or latency required for processing a memory access request.

In one embodiment, the page-referencing circuit 201 receives a memory request from a source external to a memory controller, such as a processor, graphics card, peripheral or similar source. The memory request may be in the form of a read or write operation that contains a system address or similar indicator identifying the location in memory to be accessed. This memory request is applied to two content addressable memory devices 205, 207 in parallel.

The first content addressable memory (CAM) device 205 contains a set of system addresses or similar memory location identifiers. The first CAM device 205 also contains a status indicator, such as a bit, that indicates whether a rank-bank is open or dosed. The status indicator may be referred to as a page-status bit. In one embodiment, the first CAM 205 includes a number of entries equivalent to the number of ranks multiplied by the number of banks. Each entry may consist of a system address or similar location identifier and a page-status bit. The input memory access may have a logical operand, such as a '1' bit, concatenated onto the memory address to facilitate comparison. This operation may be performed by a concatenation component 203 or similar device. In another embodiment, the logical value may be added to the memory request or inferred in the application to the first CAM 205, or similarly implemented. For example, a 1 may be added as the most significant bit of a system address. The first CAM 205 will output a hit or miss, which may be a logical true or false indicator such as a 1 or 0 based on the application of the modified memory access request to the first CAM 205.

The application of the memory access to the first CAM 205 may be modified by a CAM mask. The CAM mask isolates those aspects of the incoming memory access request and the data entries in the CAM that are to be compared for a match. In one embodiment, the mask isolates the rank and bank indicators as well as the page status indicator, which in the incoming memory access may be the concatenated bit. The mask or data for generating the mask may be stored in a configuration register of the memory controller or in a similar location.

In one embodiment, a second CAM 207 may receive the memory access request in parallel with the first CAM 205. The second CAM 207 may also contain a rank-bank combination number of entries. Each entry may include a system address or similar indicator of the last row accessed for the given rank-bank combination. The memory request may be applied to the second CAM 207 to determine if the memory request corresponds to a recently accessed row. In one embodiment, the memory access request may be or contain a system address or similar indicator that is applied to the second CAM 207. The non-column elements of the memory request and the entries in the CAM 207 may be isolated for purposes of matching using a second CAM mask or similar mechanism. The second CAM mask may be applied to the second CAM 207 from a configuration register of the memory controller or from a similar storage location. A 'hit' on the second CAM 207 indicates that the memory access request corresponds to the last row accessed for the relevant rank-bank combination. The second CAM 207 outputs a logical indicator, true or false, 1 or 0 or similar indicator based on the determination of a hit or miss. This logical indicator is provided to the next stage, such as combination logic 209 in a second stage, along with the output from the first CAM 205.

In one embodiment, the page-referencing circuit 201 generates one of a CAS command, RAS-CAS command sequence or PRE-RAS-CAS command sequence or similar indicator based on the output of the first CAM 205 and the second CAM 207 through the use of combinational logic 209. The logic may generate a PRE-RAS-CAS indicator when the first CAM indicates a hit and the second CAM indicates a miss. A CAS command or indicator may be generated when both CAMs produce a hit. In other cases a RAS-CAS command sequence indicator is generated. Any combinational logic operators may be utilized that generate the appropriate signals given the described inputs. The combinational logic may be implemented according to the conventional techniques and using conventional implementations of logic. FIG. 2 shows one example implementation using an inverter, two AND gates and a NOR gate. One of ordinary skill in the art would understand that other equivalent configurations may be utilized.

In one embodiment, the page reference, circuit 201 utilizes 16 levels of logic or less. In contrast, the conventional circuitry, for example the circuit of FIG. 1, utilizes at least 23 levels of logic. The page-referencing circuit provides at least a 50% improvement in speed over the conventional circuits. Further optimization of the CAM hit logic that is specialized for this operation and similar optimization may improve the overall speed by greater than 50%.

Figure 3:
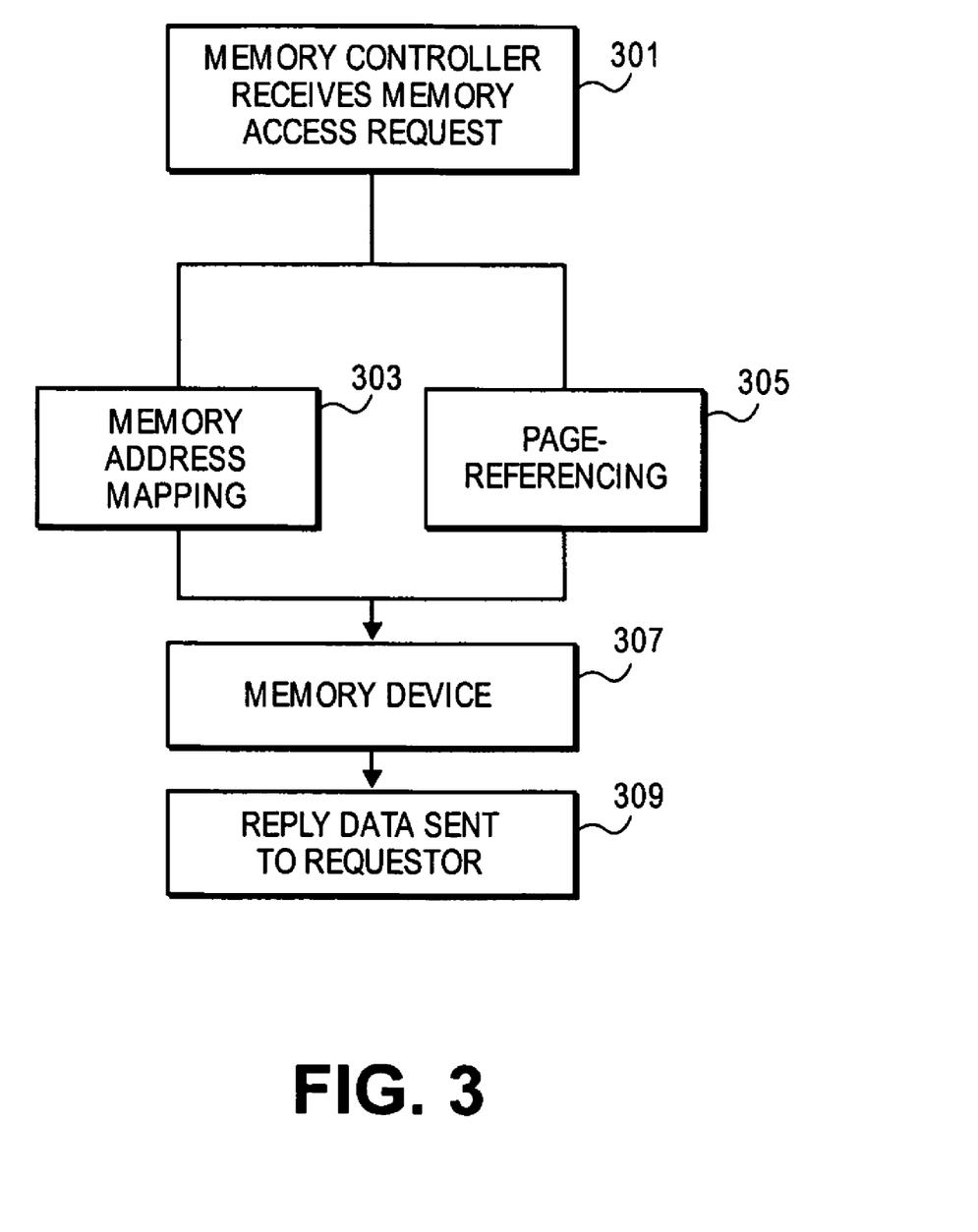
FIG. 3 is a diagram of one embodiment of a process for parallel handling of the memory-mapping and page referencing.

FIG. 3 is a diagram of one embodiment of a process for parallel handling of the memory-mapping and page referencing. In one embodiment, the process is initiated in response to receiving a memory access request by the memory controller (block 301). The request may be generated by a processor, system component, such as a graphics processor, or similar source. The memory access request may be a read or write operation, indicate a system address to be accessed and may include data to be written to the location. The system address of the memory access request may be supplied to a memory address-mapping circuit and a page-referencing circuit to execute the memory access request in parallel. Executing the request in parallel increases the speed at which the request can be serviced.

The memory address-mapping component processes the memory request to determine the rank, bank, column and row location or similar location information (block 303). In one embodiment, a system address may be multiplexed using multiplexor selector data from a configuration register to isolate each of the parts of the memory location encoded in the system address or similar indicator. This data is ultimately used to access the appropriate location in the physical memory device.

In parallel, the page-referencing component processes the memory access request to generate the appropriate CAS, RAS-CAS or pre-RAS-CAS signals (block 305) for accessing the location in memory being determined by the memory address-mapping component. This operation is completed independent of the memory address-mapping process.

The output of the memory address-mapping process and page-referencing process are applied to the relevant memory device to implement a read or write of the target memory location (block 307). The read data may then be returned to the component that generated the memory access request, an acknowledgement of a write command may be sent in reply or a similar operation may be carried out at the completion of the memory access request (block 309).

Figure 4:
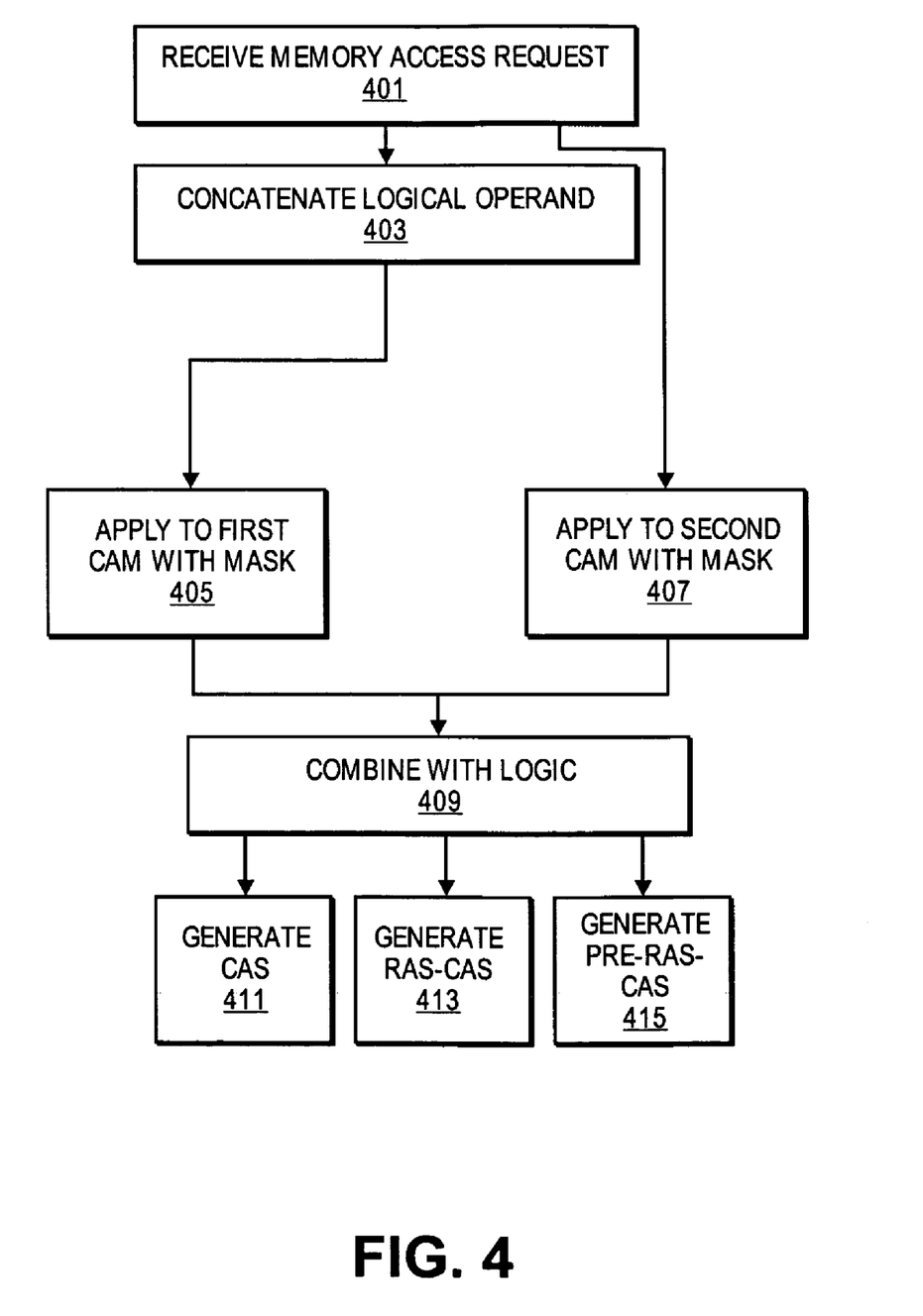
FIG. 4 is a diagram of one embodiment of a process for page-referencing.

FIG. 4 is a diagram of one embodiment of a process for page-referencing. In one embodiment, the page-referencing process is initiated when the page-referencing component receives a memory access request (block 401). The memory access request may be a system address or similar locator indicator. The system address may be forwarded along two paths simultaneously. Along the first path a logical value or indicator may be concatenated or similarly added onto the memory access request (block 403). For example, a bit with the value 1 may be concatenated onto a system address. This indicator may be added to any part of the memory access request, such as inserted into any place in a system address. The combined system address or similar indicator and logical value is applied to the first CAM (block 405). The first CAM contains a set of locator addresses such as system addresses for each rank and bank combination of the memory. In addition, the first CAM includes an indicator of the page status with each locator indicator. Applying the memory access request with the added logical value allows a simultaneous matching of a memory request locator with the rank-bank combination locators in the first CAM as well as a match of the logical value with the status indicator bit. In one embodiment, the added logical value is matched for comparison with an open status indicator. In another embodiment, a closed status indicator or similar indicator may be used.

In another embodiment, a logical value is not added to the memory access request as a separate operation. The logical value may be implied or the first CAM configured to infer the logical value or a similar process may be used to check the page status for the rank-bank corresponding to the memory access request.

The application of the concatenated request to the first CAM is further altered by a mask that is applied to the first CAM. The mask isolates the rank and bank indicators as well as the status indicator for matching. As a result, the output of the first CAM upon application of the concatenated memory access request will indicate if the page for the rank and bank combination is open or closed.

On the second path, the memory access request is applied to the second CAM with a different mask (block 407). The second CAM contains a set of locators, such as system addresses that indicate the last accessed row for each rank-bank combination. The mask makes the column indicators in the memory access and second CAM irrelevant to the process. As a result the output of the second CAM generates a hit when the last row accessed from a rank-bank combination matches a rank-bank and row combination from the memory access request.

The output of the first CAM and second CAM are combined with combinational logic (block 409) to generate one of a CAS command (block 411), a RAS-CAS command sequence (block 413) and a PRE-RAS-CAS command sequence (block 415). These commands are then applied to the memory device along with the output of an address-mapping component to perform the memory access.

Figure 5A:
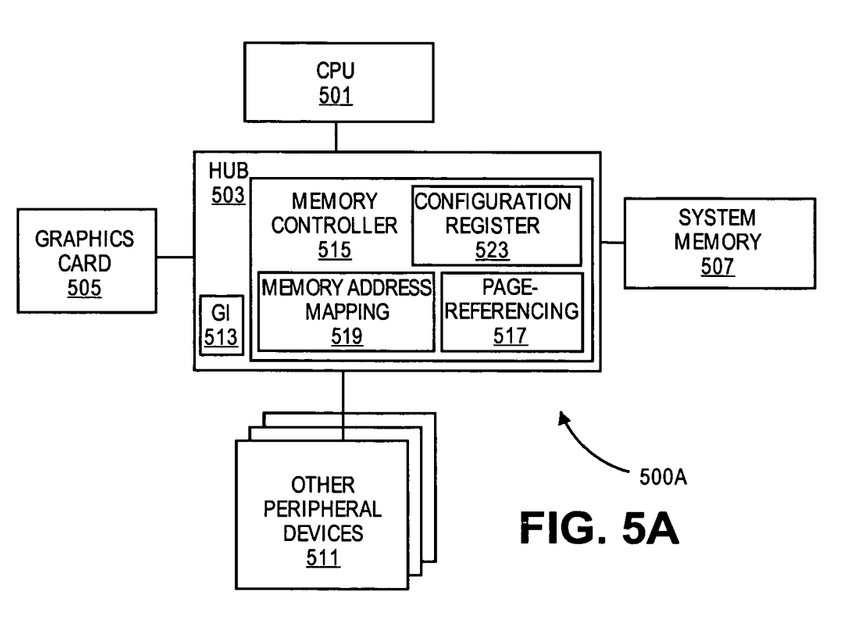
FIG. 5A is a diagram of one embodiment of a system utilizing the parallel page-referencing and memory address-mapping.

FIG. 5A is a diagram of one embodiment of a system 500A utilizing parallel page-referencing and memory address-mapping. The system 500A may include a central processing unit 501 to execute applications and similar programs. The central processing unit 501 may communicate with other system components through a memory controller hub 503. The memory controller hub 503 may handle communication between the different system components. In another embodiment, a separate Input/Output (IO) hub may assist or be a part of the memory controller hub 503.

The memory controller hub 503 may include interface and controller devices for communicating with different system components. For example, the memory controller hub 503 may include graphics interface components 513 for communicating with a graphics card 505 or graphics processor. In another embodiment, no graphics card or interface is present because the graphics processor is integrated into the memory controller hub 503.

The memory controller hub may include a memory controller 515 that interfaces with system memory 507. The memory controller 515 may include the page-referencing component 517 and address-mapping component 519. In one embodiment, the memory controller 515 may include a configuration register 523 that stores configuration data for the controller and may also store mask data for the page-referencing component 507. In another embodiment, the mask data may be stored in any other data storage device.

The memory controller hub 503 may be further connected with any number of other devices 511. Such devices may include network cards, audio card, input devices and similar devices.

Figure 5B:
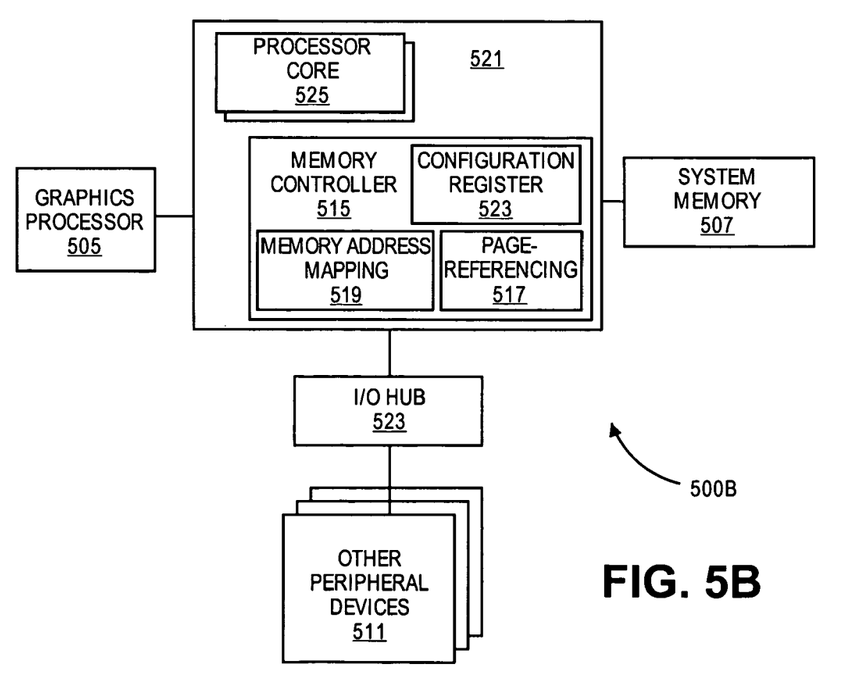
FIG. 5B is a diagram of another embodiment of a system utilizing the parallel page-referencing and memory address-mapping.

FIG. 5B is a diagram of another embodiment of a system 500B utilizing parallel page-referencing and memory address-mapping. In this embodiment, the memory controller hub may be located or integrated onto the same die 521 as the processor. Multiple processor cores 525 may also be present on the die. The integrated memory controller hub includes the memory controller 515, the page-referencing component 517 and the address-mapping component 519. The memory controller 515 may also include a configuration register 523 or similar device that stores mask data.

In one embodiment, a separate IO hub 523 may be present to facilitate communication with other system components 511. In a further embodiment, the IO hub 523 functionality may also be integrated onto the die 521.

In another embodiment, the parallel memory address-mapping and page-referencing structure may be used in any device that utilizes dynamic RAM including gaming consoles, handheld devices, cellular phones, graphics cards and similar devices and components. The parallel structure may be a subcomponent of a memory controller in these devices or may be integrated with the memory devices.

In one embodiment, the page-referencing structures are implemented as hardware devices. In another embodiment, these components may be implemented in software (e.g., microcode, assembly language or higher level languages). These software implementations may be stored on a machine-readable medium. A "machine readable" medium may include any medium that can store or transfer information. Examples of a machine readable medium include a ROM, a floppy diskette, a CD-ROM, a DVD, flash memory, hard drive, an optical disk or similar medium.

In the foregoing specification, the embodiments of the invention have been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
receiving a memory access request;
mapping the memory access request to a location in a memory device by applying the memory access request to a first content addressable memory (CAM) to determine if a page status associated with a rank-bank combination is open and applying the memory access request to a second content addressable memory (CAM) to determine a row match; and
executing a page-reference operation in parallel to the mapping of the memory access.

2. The method of claim 1, wherein mapping the memory access request includes determining any combination of a rank, bank, row or column of requested data in the memory.

3. The method of claim 1, further comprising:
generating any one of a row access strobe (RAS) and column access strobe (CAS) command sequence, a CAS command or a precharge command (PRE)-RAS-CAS command sequence.

4. The method of claim 1, further comprising:
concatenating a logical value to the memory access request.

5. The method of claim 1, further comprising:
generating a CAS command if a row match and an open page status are indicated by the first CAM and second CAM.

6. The method of claim 1, further comprising:
generating a row access strobe (RAS) and column address strobe (CAS) command sequence, if the first CAM generates a miss.

7. The method of claim 1, further comprising:
generating a precharge, row access strobe, and column access strobe (PRE-RAS-CAS) command sequence, if the first CAM generates a hit and the second CAM generates a miss.

8. The method of claim 1, wherein the memory access request includes a system address.

9. The method of claim 1, further comprising:
retrieving a first mask from a configuration register; and
applying the first mask to the first CAM with the memory access request to determine if the page status is open.

10. An apparatus comprising:
a first content addressable memory (CAM) to receive a memory access request and determine if a corresponding page is open;
a second CAM to receive the memory access request and determine a row match; and
combinational logic coupled to the first CAM and second CAM to generate one of a column access strobe (CAS) indicator, a row access strobe (RAS)-CAS indicator or a precharge (PRE)-RAS-CAS indicator.

11. The apparatus of claim 10, further comprising:
a concatenation component to add a logical value to the memory access request.

12. The apparatus of claim 10, further comprising:
a configuration register to store a mask to isolate a rank and bank indicator and a page status indicator in the memory access request.

13. The apparatus of claim 12, wherein the configuration register stores a mask to isolate a column indicator in the memory access request.

14. The apparatus of claim 10, further comprising:
an address-mapping component to determine a location of data for a memory access request in a set of memory devices.

15. The apparatus of claim 14, wherein the address-mapping component and the first and second CAM process the memory access request in parallel.

16. A system comprising:
a memory controller;
a graphics interface coupled to the memory controller;
a memory device coupled to the memory controller;
an address-mapping component coupled to the memory controller, the address-mapping component to receive a memory access request and determine a location of data in the memory device; and
a page-referencing component to receive the memory access request in parallel to the address-mapping component, the page referencing component to generate one of a column access strobe (CAS) indicator, a row access strobe (RAS)-CAS indicator, or a precharge (PRE)-RAS-CAS indicator wherein the page-referencing component comprises:
a first content addressable memory (CAM);
a second CAM; and
combinational logic.

17. The system of claim 16, further comprising:
a configuration register coupled to the page-referencing component, the configuration register to store a mask to isolate a rank and bank indicator and a page status indicator in the memory access request.

18. The system of claim 17, wherein the configuration register stores a mask to isolate a column indicator in the memory access request.

19. The system of claim 16, wherein the page-referencing component further comprises:
a concatenation component.

20. The system of claim 16, wherein the memory controller is on a processor die.

21. The system of claim 16, wherein the memory controller is on a die separate from a processor.

22. The system of claim 16, further comprising:
a processor with a plurality of cores.

* * * * *

UNITED STATES PATENT AND TRADEMARK OFFICE
CERTIFICATE OF CORRECTION

| | | |
|---|---|---|
| PATENT NO. | : 7,437,501 B2 | Page 1 of 1 |
| APPLICATION NO. | : 11/471111 | |
| DATED | : October 14, 2008 | |
| INVENTOR(S) | : Mitra | |

It is certified that error appears in the above-identified patent and that said Letters Patent is hereby corrected as shown below:

In column 1, at line 51, delete "dosed" and insert --closed--.

In column 3, at line 3, delete "dosed" and insert --closed--.

Signed and Sealed this

Third Day of March, 2009

JOHN DOLL
*Acting Director of the United States Patent and Trademark Office*